United States Patent [19]

Stark

[11] Patent Number: 5,271,685

[45] Date of Patent: Dec. 21, 1993

[54] SCREW CONNECTION BETWEEN RODS AND JOINT MEMBERS OF A THREE-DIMENSIONAL SPACE FRAMEWORK OR THE LIKE

[75] Inventor: Manfred Stark, Retzstadt, Fed. Rep. of Germany

[73] Assignee: Mero-Raumstruktur GmbH & Co., Wurzburg, Fed. Rep. of Germany

[21] Appl. No.: 755,631

[22] Filed: Sep. 5, 1991

[30] Foreign Application Priority Data

Sep. 6, 1990 [DE] Fed. Rep. of Germany ....... 4028314

[51] Int. Cl.$^5$ ............................................. F16B 7/00
[52] U.S. Cl. ................................... 403/171; 403/176; 403/306; 403/337; 403/200; 52/648.1
[58] Field of Search ............... 403/171, 172, 174, 176, 403/178, 287, 169, 170, 173, 175, 177, 306, 300, 337, 335, 217, 218, 219, 187, 189, 190, 192, 199, 200, 230, 258, 262, 260; 52/645, 646, 648

[56] References Cited

U.S. PATENT DOCUMENTS

| | | | |
|---|---|---|---|
| 2,477,856 | 8/1949 | Benoit | 403/199 |
| 2,676,279 | 4/1954 | Wilson | 403/337 X |
| 3,914,060 | 10/1975 | Miller et al. | 403/171 |
| 4,484,430 | 11/1984 | Rossman | 403/174 X |
| 4,664,550 | 5/1987 | Jachmann et al. | 403/171 |
| 4,767,230 | 8/1988 | Leas, Jr. | 403/337 X |

FOREIGN PATENT DOCUMENTS

| | | |
|---|---|---|
| 0159452 | 3/1987 | European Pat. Off. |
| 2704954 | 8/1978 | Fed. Rep. of Germany |
| 3017444 | 11/1981 | Fed. Rep. of Germany |
| 3406550 | 9/1985 | Fed. Rep. of Germany ........ 52/648 |
| 3803223 | 5/1989 | Fed. Rep. of Germany ...... 403/170 |
| 3219520 | 5/1990 | Fed. Rep. of Germany |
| 2582361 | 11/1986 | France ................................. 52/648 |
| 195021 | 8/1990 | Japan ................................... 403/335 |
| 3113 | of 1890 | United Kingdom ................ 403/337 |
| 651188 | 3/1951 | United Kingdom ................ 403/337 |
| 2005791 | 9/1978 | United Kingdom |
| 2197417 | 3/1988 | United Kingdom |

OTHER PUBLICATIONS cf. Mengeringhausen, Raumfachwerke aus Staeben Und, Knoten, Bauverlag GmbH Wiesbaden and Berlin, 7th Edition 1975, p. 68.

Primary Examiner—Randolph A. Reese
Assistant Examiner—Harry C. Kim
Attorney, Agent, or Firm—Frank P. Presta

[57] ABSTRACT

A connection assembly having a rod, a joint member with a threaded bore therein, a tapered end piece with a recessed axial through-hole therein, and a set screw received in the through-hole and having a threaded screw end which extends out from one end of the end piece and is threadably received in the threaded bore of the joint member. The end piece has a plurality of end piece bores concentrically arranged around the through-hole and extending substantially parallel thereto. A connection board is secured to an end of the rod and includes a plurality of board bores therein which correspond to the end piece bores. Screws extend through the corresponding end piece bores and board bores to connect the board to the end piece, thereby securely connecting the rod to the joint member.

8 Claims, 3 Drawing Sheets

SCREW CONNECTION BETWEEN RODS AND JOINT MEMBERS OF A THREE-DIMENSIONAL SPACE FRAMEWORK OR THE LIKE

BACKGROUND OF THE INVENTION

The invention relates to a screw connection between rods and joint members of a three-dimensional space framework or the like, in which the rods end in tapering end pieces, which may be truncated conical pieces with a through-hole recessed axially to receive a set screw which can be threaded in and can be axially prebiased.

Known screw connections for the above purpose have a screw bolt at each end of a rod, which in turn is supported in truncated conical end pieces rotatable and axially slidable on the rod. The truncated conical end pieces are welded to the rod. To drive in the screw bolt, there is in turn a so-called key socket or drive socket, which is connected nonrotatably with the screw bolt, and on the other hand the screw bolt can also exhibit an axial movement in the drive socket. In completely assembled state the drive socket is inserted between the outside front end of a truncated conical end piece and a joint member (cf. Mengeringhausen, Raumfachwerke aus Staeben und Knoten, Bauverlag GmbH Wiesbaden and Berlin, 7th edition 1975, page 68). The screw bolt of such a connection can be thrust in axial direction by dynamic charges, which if they have a long life can develop the danger of breaking the bolt, with grave results. Indeed it is already known to bias (to lengthen) the screw bolts through the drive socket by means of a torque wrench to such a degree that the biasing force is greater than the dynamic charges being applied from the outside. Beyond a certain size of the screw connection between joint member and rod and thus a certain size of the screw bolt, however, this method is no longer suitable, on account of the relatively high torque then being applied and the reaction moment which arises as a result of the torque, which causes the joint member to be twisted. Actually it is possible to apply the requisite high torque with a so-called hydraulic wrench. These tools however are quite difficult to operate and do not work reliably on account of continually changing lever arms. Another problem of the above construction resides in that a so-called assembly hole must be present in the tubular rod for introduction of the screw bolt into the welded-on truncated conical end pieces.

A screw connection of the aforementioned structural type is already known from German Patent 3219520, in which the biasing of the screw bolt is attained by appropriate operation of special multi-part drive sockets. Each drive socket in this known solution consists of at least two parts lying one behind the other lengthwise along the screw bolt, which have screw surfaces facing one another, whereby by twisting these parts relative to one another the distance of the end surfaces of the drive socket from one another can be modified. Therefore when the parts of the drive socket are adjusted axially in opposite directions by suitable relative movement, they are pressed against the relevant joint member or rod end and with continuing relative forward movement they cause the biasing of the screw bolt. By this means it is possible to adjust this bias so that it is greater than the dynamic charges working on the screw bolt from outside. Such multi-part special drive sockets however are relatively costly and the biasing of the screw bolt by means of these drive sockets at the construction site is still relatively problematical. In addition, with this known solution the screw bolts are mounted in truncated conical end pieces, which are welded onto the ends of each one of the rods. Thus here too the aforementioned assembly hole is still required in the tubular rod.

SUMMARY OF THE INVENTION

The object of the invention is to disclose a screw connection between rods and joint members of a three-dimensional framework or the like in which the screw bolt or the set screw can be pre-biased beforehand at the factory simply with the aid of suitable devices.

According to the invention this object is attained in that the tapering end pieces include concentric to the axial through-hole a plurality of bores having parallel axes to receive assembly-and-fixing screws which can be threaded into threaded bores in a connection board which is fastened to the ends of the rods for instance by welding.

Thus it is possible to connect the end pieces with the joint members already during production, which can be accomplished for instance hydraulically in a suitable device. At the construction site one need then only connect the relevant end pieces which are already connected with a joint member with the connection boards on the rods by means of assembly-and-fixing screws. For this purpose the assembly-and-fixing screws could be tightened by means of traditional torque wrenches. Another solution for the above problem is characterized in that the tapering end pieces include concentric to the axial through-hole a plurality of bores having parallel axes to receive blind rivets, which can be fastened in bores in a connection board, which is attached to the ends of the rods, for instance by welding.

In either of the above solutions a clear advantage is that the assembly hole required in the present state of the art in the rod for the introduction of the set screw is deleted.

Different configurations of the invention are derived from the dependent claims. Preferably, then, in order to save weight, the connection boards attached to the ends of the rods are configured to be annular. Production of a corrosion-resistant coating in the inside of the rods is thus also facilitated.

According to still another configuration of the invention the connection boards fastened to the ends of the rods extend partially into the rods and their segments projecting out of the rods preferably have an outside diameter corresponding to the rod outside diameter.

The assembly procedure at the construction site is simplified and the assembly-and-fixing screws find a good seat when according to still another embodiment of the invention the concentrically arranged bores in the end pieces are surrounded by annular, countersunk, bearing surfaces for the heads of the assembly-and-fixing screws and synclinal recesses on the periphery of the end pieces are provided for introduction of the assembly-and-fixing screws into the boreholes.

Still another configuration of the invention is characterized in that the tapering end pieces in the form of truncated conical pieces at their front ends having the smaller diameter have a projection in the form of a cylinder, a hexagonal piece or the like, through which extends the axial through-hole. Because of this measure it is possible, as with the screw connections with drive sockets, to advantageously use relatively small joint members with quite large rod diameters.

When according to still another embodiment of the invention the tapering end pieces in the form of truncated conical pieces are provided with a cylindrical segment on their front ends with the larger diameter, and the outside diameter of the cylindrical segment corresponds to that of the connection board and the rod, a smooth transition between the truncated conical pieces, the connection boards and the relevant rod is advantageously attained.

BRIEF DESCRIPTION OF THE DRAWINGS

Finally, the invention is to be explained hereinafter in greater detail relative to the drawings of some exemplary embodiments. In the drawings

DESCRIPTION OF THE PREFERRED EMBODIMENTS

Figure 1:
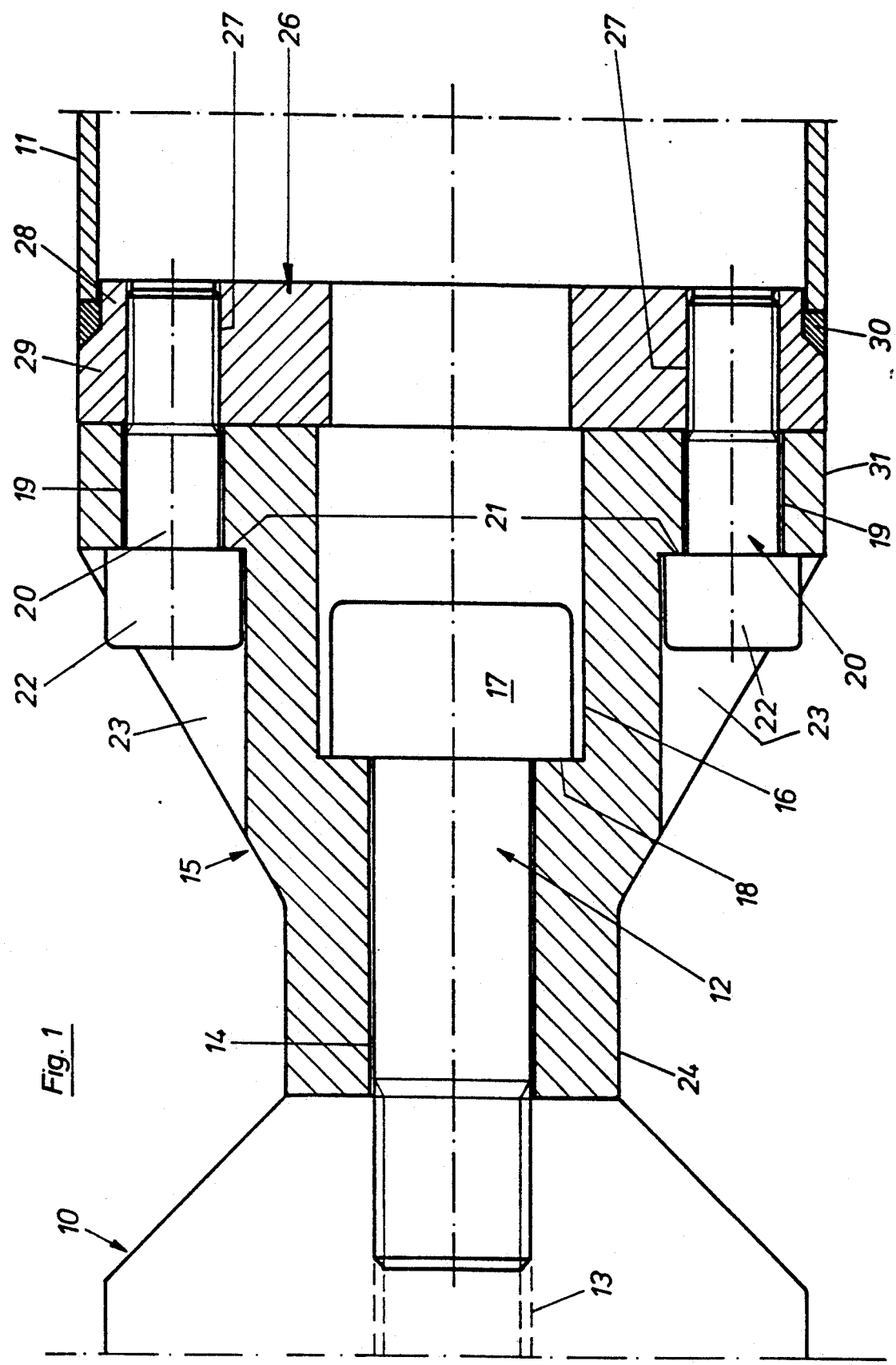
FIG. 1 is a longitudinal section through a completed screw connection according to the invention with a part of a rod and a joint member of a three-dimensional framework.

A screw connection between a joint member and a rod in a three-dimensional framework, the framework composed of a plurality of rods and joint members, is shown in FIG. 1. A joint member 10 incorporates an end 11 of a tubular rod of this three-dimensional framework. A set screw 12, threaded into one of numerous threaded bores 13 in joint member 10, connects each rod end with a joint member 10. Set screw 12 extends through a through-hole 14 in an end piece 15, in this exemplary embodiment embodied as a truncated conical member. Through-hole 14 includes a segment 16 of widened diameter to receive the head 17 of screw 12. When the screw connection is completed, head 17 rests on an annular bearing surface 18 between the two segments of through-bore 14. End piece 15 is connected at the factory with joint member 10 by means of set screw 12, and prebiasing of set screw 12 is carried out. The connection of end piece 15 with rods 11 then is carried out at the construction site this process being described hereinafter.

Each end piece 15 which is tapered toward the outside in the exemplary embodiment includes four bores 19 of parallel axes, arranged concentric to through-hole 14, to receive assembly-and-fixing screws 20. At the ends of bores 19 seen to the left in FIG. 1 are located annular, countersunk, bearing surfaces 21 for the heads 22 of assembly-and-fixing screws 20. Synclinal recesses 23 joint up with bearing surfaces 21 to simplify the introduction of said assembly-and-fixing screws 20 into bores 19.

Figure 2:
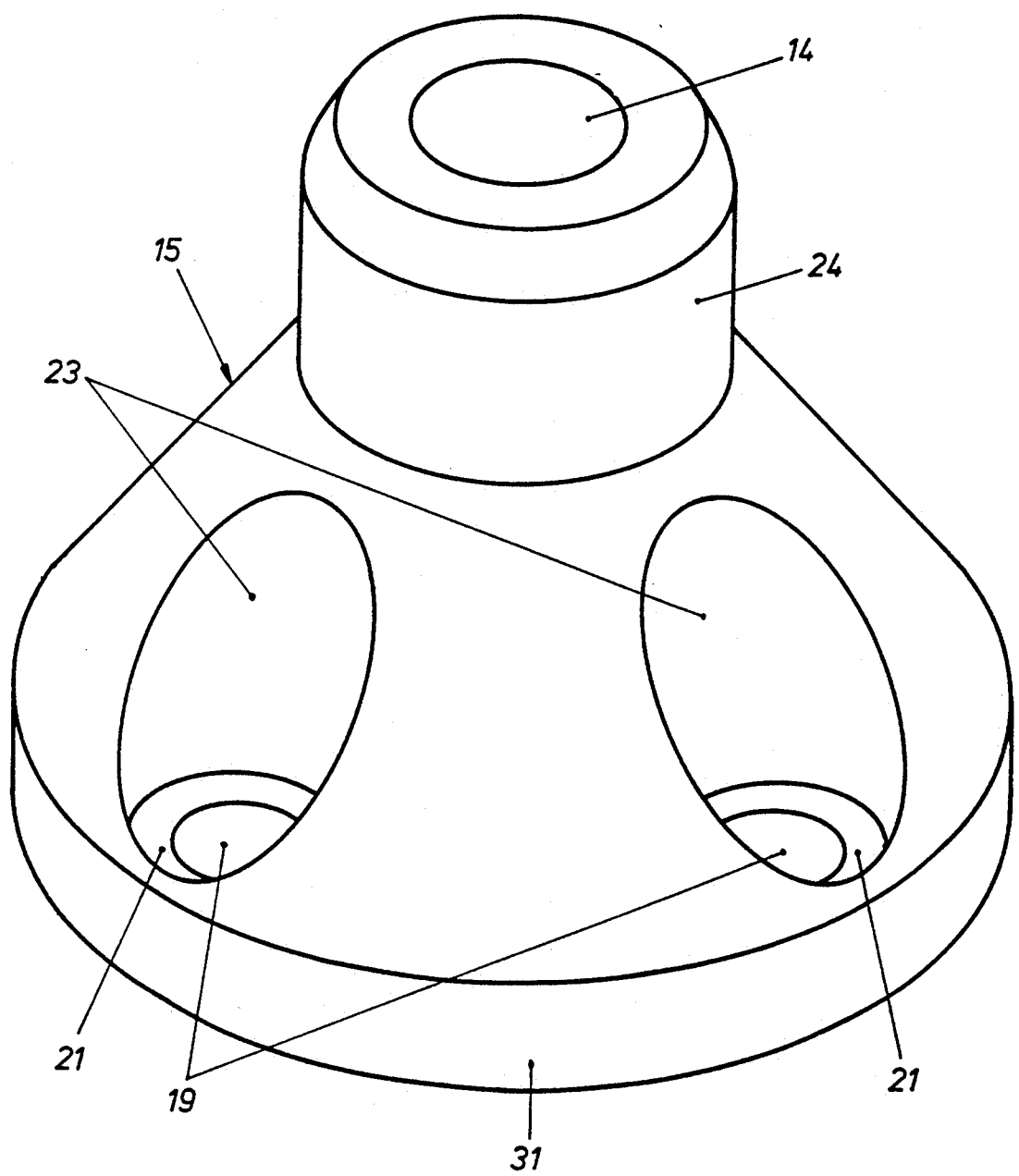
FIG. 2 is an oblique view of a truncated conical end piece with a cylindrical projection at the front end with the smaller diameter.
Figure 3:
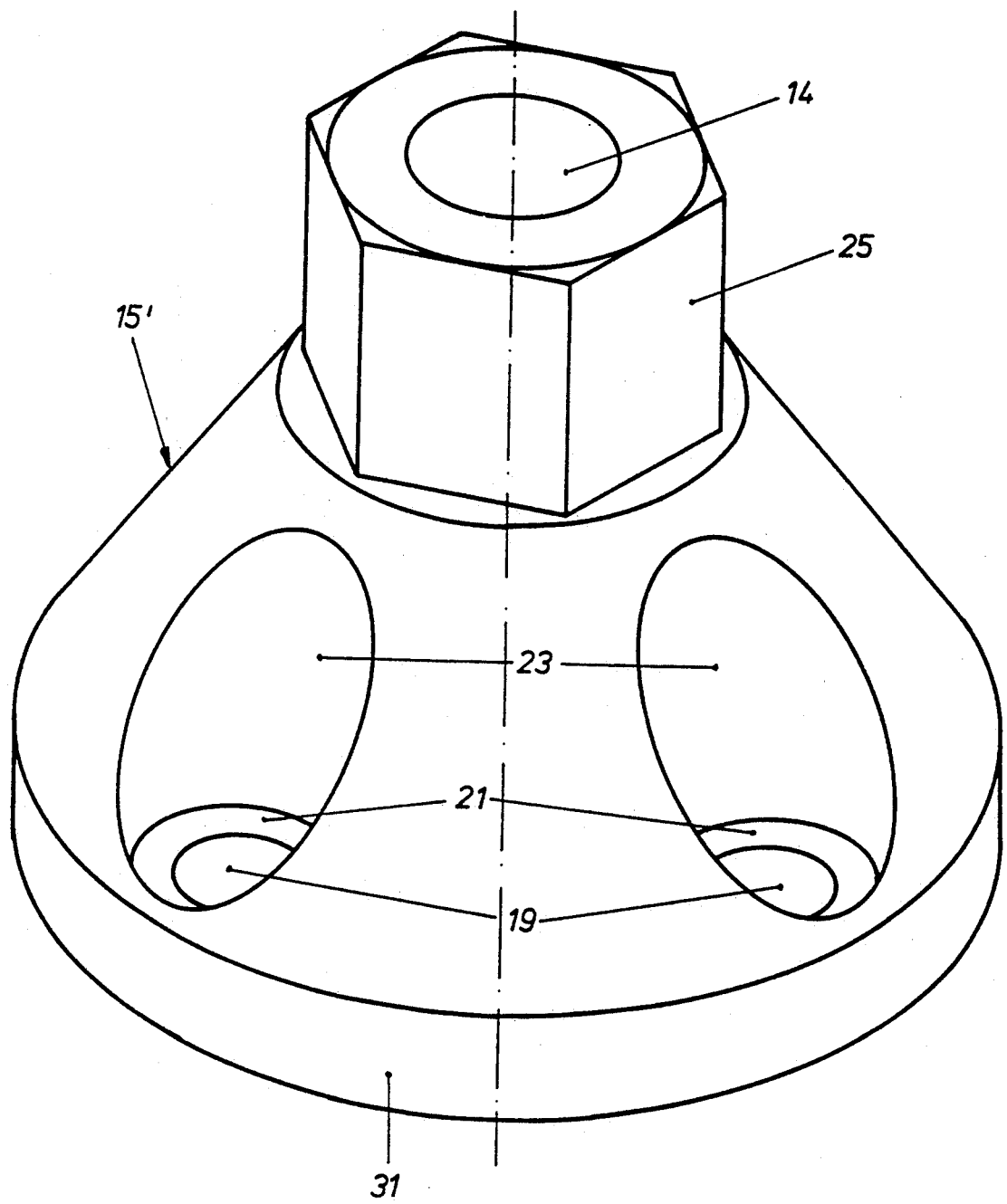
FIG. 3 is an oblique view similar to that of FIG. 2 of another truncated conical end piece, which at its front end with the smaller diameter has a projection in the form of a hexagonal piece.

At the front end with its smaller diameter, end piece 15 shown in FIG. 2 has a projection in the form of a cylinder 24, through which extends through-hole 14. In the exemplary embodiment of FIG. 3 a projection in the form of a hexagonal member 25 is provided instead of cylinder 24. Cylinder 24 or hexagonal member 25 form one part with end piece 15 or 15 of FIG. 3.

To each end of rod 11 is attached a connection board 26, which is configured to be annular in the exemplary embodiment of FIG. 1 and has four corresponding threaded bores 27, into which can be screwed assembly-and-fixing screws 20 at the construction site, in order to connect the structure of joint members 10 and end pieces 15 with rods 11. Assembly-and-fixing screws 20 could then be tightened with a traditional torque wrench.

Connection boards 26 extend with a segment 28 partially into the hollow space of each rod 11. The segment 29 projecting out of rod 11 has an outside diameter corresponding to the rod outside diameter. Reference 30 is a welding seam, by means of which connection board 26 is attached to the end of rod 11. Truncated conical end pieces 15 and 15' have a cylindrical segment 31 at their side turned toward rod 11, of which the outside diameter corresponds to the outside diameter of connection board 26 at its segment 29.

Instead of assembly-and-fixing screws 20 for example also blind rivets (not shown) could conceivably be used for the connection of end pieces 15 with connection boards 26. In this case threaded bores 27 are replaced by smooth cylindrical bores in connection board 26.

Finally, it is also to be noted that the screw connections which are at the two ends of each rod 11 of the three-dimensional space framework are configured to be identical for instance to those of FIG. 1. In any case it can be advantageous that the prebiasing of set screws 12 be carried out at the factory using suitable devices.

What is claimed is:

1. Connection assembly, comprising a rod, a joint member having a threaded bore therein, a tapered end piece having a recessed axial through-hole therein, a set screw received in said axial through-hole and having a threaded screw end which extends out from one of said end piece and is threadably received in said threaded bore, said end piece having a plurality of end piece bores therein concentrically arranged around said through-hole and extending substantially parallel thereto, a connection board secured to an end of said rod and including a plurality of board bores therein which correspond to said end piece bores, and further including means extending through corresponding end piece bores and board bores for connecting said board to said end piece, thereby securely connecting said rod to said joint member, said connection board being of annular configuration and having an outside diameter corresponding to the outside diameter of said rod, and said connection board having a portion extending into said rod.

2. Connection assembly as defined in claim 1, wherein board bores are threaded bores, and further wherein said connecting means includes a plurality of assembly-and-fixing screws which extend through said end piece bores and are threadably received in said board bores, respectively.

3. Connection assembly as in claim 2 wherein said end piece bores are surrounded by annular, countersunk bearing surfaces adapted to receive the heads of said assembly-and-fixing screws, and synclinal recesses are provided at the periphery of said end piece for the introduction of said assembly-and-fixing screws into said end piece bores.

4. Connection assembly as defined in claim 1, wherein said connecting means includes a plurality of blind rivets positioned in corresponding end piece bores and board bores, respectively.

5. Connection assembly as in claim 1 wherein said tapered end piece is of truncated conical configuration and has a projection at its smaller end which is of cylindrical shape and has said through-hole extending therethrough.

6. Connection assembly as in claim 1 wherein said tapered end piece is of truncated conical configuration and has a projection at its smaller end which is of hexagonal shape and has said through-hole extending therethrough.

7. Connection assembly as in claim 11 wherein said tapered end piece has a cylindrical portion at its larger end, said cylindrical portion having an outside diameter corresponding to that of said connection board and said rod.

8. Connection assembly comprising a rod, a joint member having a threaded bore therein, a tapered end piece having a recessed axial through-hole therein, a set screw received in said axial through-hole and having a threaded screw end which extends out from one end of said end piece and is threadably received in said threaded bore, said end piece having a plurality of end piece bores therein concentrically arranged around said through-hole and extending substantially parallel thereto, a connection board secured to an end of said rod and including a plurality of board bores therein which correspond to said end piece bores, and further including means extending through corresponding end piece bores and board bores for connecting said board to said end piece, thereby securely connecting said rod to said joint member, said connection board being of annular configuration, and said tapered end piece having a cylindrical portion at its larger end, said cylindrical portion having an outside diameter corresponding to that of said connection board and said rod.

* * * * *